Figure 1:
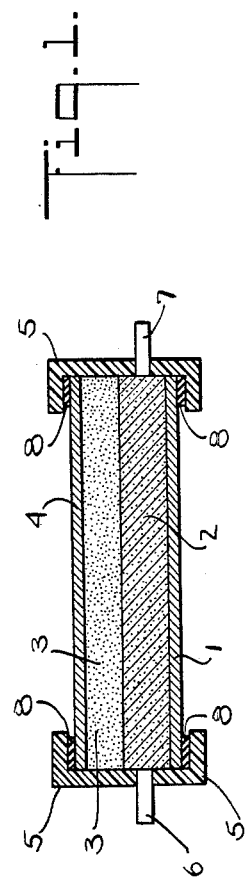

Dec. 18, 1962 A. SCHMIER 3,069,488
GALVANIC PRIMARY CELL
Filed Dec. 7, 1959

INVENTOR.
ALFRED SCHMIER
BY
AGENT

3,069,488
GALVANIC PRIMARY CELL
Alfred Schmier, Ellwangen (Jagst), Germany, assignor to Pertrix-Union G.m.b.H., Ellwangen (Jagst), Germany, a company of Germany
Filed Dec. 7, 1959, Ser. No. 857,631
Claims priority, application Germany Dec. 11, 1958
2 Claims. (Cl. 136—116)

The present invention relates to a primary battery and more particularly to a water activated galvanic cell with a soluble metal electrode and a cuprous chloride depolarizer.

Primary batteries with a cuprous chloride depolarizer and a zinc or magnesium electrode are known. Operation of such batteries is initiated by filling them with water. Since the self-discharge of such batteries is very large, they must be placed in operation promptly after activation. Even so, a considerable portion of the available electrical energy is lost because of the spontaneous discharge and the development of heat. Therefore, the efficiency of such cells is considerably reduced even if they are operated immediately after they are activated.

It is the primary object of the present invention to increase the efficiency and economy of primary batteries of this type by substantially reducing their spontaneous discharge.

This and other objects are accomplished in accordance with this invention by adding a sufficient amount of copper oxychloride to the cuprous chloride depolarizer to reduce the spontaneous discharge of the battery.

It has been found unexpectedly that the addition of about 2% to 20%, by weight of the cuprous chloride, preferably about 10% to 12%, of copper oxychloride considerably reduces the self-discharge of the cell. The most suitable soluble electrode materials are zinc and magnesium.

The invention will be more fully understood by reference to the following detailed description of a specific embodiment thereof, as illustrated in the accompanying drawings, but it is in no way limited thereby. In the drawings, FIG. 1 shows a vertical cross-section of a conventional galvanic cell of this type and FIG. 2 is a graph illustrating the technical advantages of using a depolarizer according to the present invention.

Figure 2:
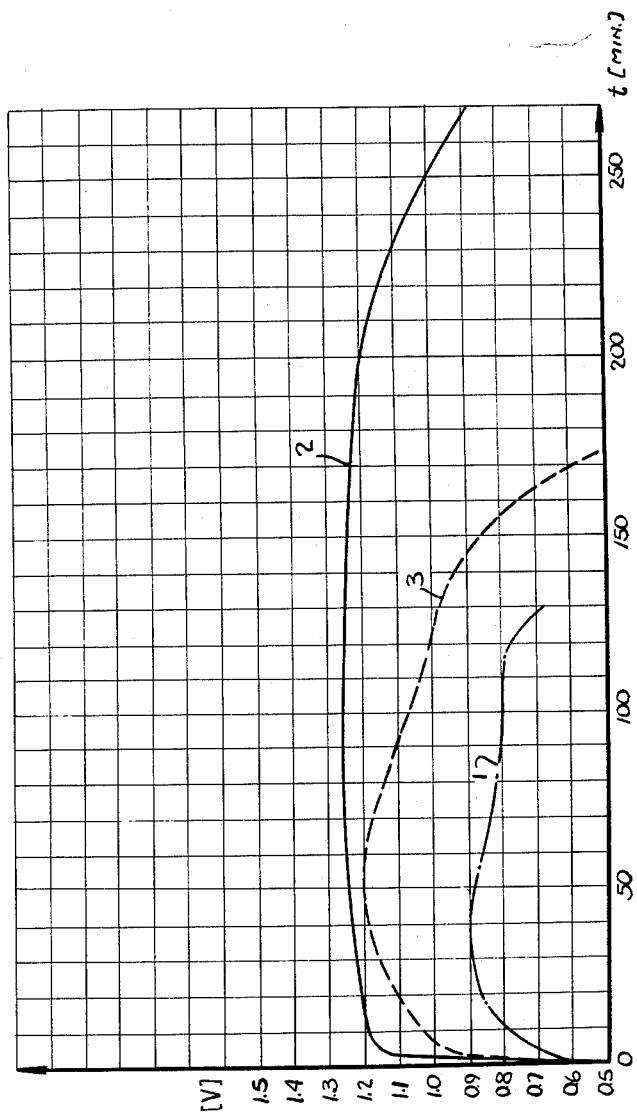

FIG. 1 shows a magnesium plate 1, which serves an anode. On top of said magnesium plate there is placed the electrolyte carrier 2, for instance, of filter paper impregnated with electrolyte salts such as nonhydroscopic chlorides of metals of the group of alkali metals or alkaline earth metals, preferably with sodium chloride or potassium chloride, and suitable swelling agents such as flour or starch. Preferably the electrolyte carrier in the illustrated cell consists of 8 layers of cotton wool such as is used as filler material in milk filters. The depolarizer mix 3 consists of cuprous chloride (CuCl) with an admixture of copper oxychloride and a conventional conductive material such as graphite or carbon black. A suitable depolarizer mix consists, for instance, of 90 parts by weight of cuprous chloride,
10 parts by weight of copper oxychloride, and
5 parts by weight of carbon black.

Current collector 4 is connected in good electrical contact with said depolarizer mix. Said current collector consists, for instance, of a copper sheet or foil. Outer casing 5 of the cell consists of a tube of a suitable plastic material, which is provided with seal 8 to fluid tightly seal current collector 5 and magnesium electrode 1.

In this casing there are provided filling tubes 6 and pressure release tubes 7. The cell is activated by introducing water through filling tubes 6. About 50% of water calculated for the dry weight of the cell are absorbed by the cell. Thus, a battery consisting of 25 cells of the dimentions 9.5 cm. x 2.5 cm. which weighs in inactivated, dry condition about 70 g., has in the activated state a weight of 100 g. to 110 g.

The illustrated structure of the battery is conventional. The curves in FIG. 2 illustrate the advantages of the depolarizer according to the present invention. Curve 1 shows the working voltage at a constant discharge of 33 milliamperes of a cell such as shown in FIG. 1 and having a copper oxychloride depolarizer. As is clearly evident, the working voltage of such a cell is so low that the use of copper oxychloride alone as depolarizer material is definitely not indicated. Its use should also be discouraged by the knowledge that copper oxychloride is an extremely reactive compound so that it is unexpected that it may be used in galvanic cells at all.

Curve 2 shows the working voltage under the same discharge conditions of the same cell but having a depolarizer of cuprous chloride with the copper oxychloride addition according to the present invention. As will be noted, the spontaneous discharge of such a cell is substantially reduced while the discharge efficiency is considerably increased. The cuprous chloride depolarizer of the cell used to establish curve 2 contains 10%, by weight, of copper oxychloride.

The working voltage of a conventional cell with a cuprous chloride depolarizer, again under the same discharge conditions, is shown in curve 3. As can be seen from this curve, the spontaneous discharge of such cells begins already after 50 minutes of discharge and after an extended discharge time, the voltage of the cell falls relatively rapidly. In contrast thereto, curve 2 shows that a cell with a depolarizer according to the present invention maintains a relatively constant voltage over a long period of time and begins to fall only after 200 minutes of operating time. Thus, the addition of copper oxychloride to the cuprous chloride depolarizer unexpectedly increases the discharge efficiency of the cell as much as 100% or even more.

The experiments to establish the curves of the graph of FIG. 2 were carried out at room temperature and with cells of the following characteristics: The cell corresponds to that described hereinabove and is composed of the magnesium anode 1, the filler paper electrolyte carrier 2 impregnated with sodium chloride, and the depolarizer mix consisting of Curve 1: copper oxychloride alone;
Curve 2: a mixture of copper oxychloride and cuprous chloride in the proportion 1:9 according to the present invention;
Curve 3: cuprous chloride alone.

The exact amount of the copper oxychloride addition to the depolarizer depends on the purpose for which the cell is to be used, i.e. the specific loads to which the battery is to be subjected. Also, the most advantageous working temperature of the battery may be varied by changing the amount of the copper oxychloride additive. The amount of copper oxychloride added is held relatively low at about 2% by weight of the cuprous chloride if the cell is to operate at low temperatures of, for instance, −40° C. to −50° C. If the battery is designed for use at normal or tropical temperatures, the copper oxychloride addition to the depolarizer is up to a maximum content of about 20%.

While the primary battery of the present invention has been described in connection with certain specific embodiments thereof, it will be clearly understood that many

I claim:

1. A galvanic primary cell comprising a soluble metal electrode and a depolarizer composed essentially of cuprous chloride and from about 2% to about 20% by weight of the cuprous chloride of copper oxychloride.

2. The galvanic primary cell of claim 1, wherein said soluble metal electrode is composed of a metal selected from the group consisting of zinc and magnesium.

References Cited in the file of this patent

UNITED STATES PATENTS

| | | |
|---|---|---|
| 2,640,091 | Pucher et al. | May 26, 1953 |
| 2,699,459 | Blake et al. | Jan. 11, 1955 |

FOREIGN PATENTS

| | | |
|---|---|---|
| 5922/84 | Great Britain | Apr. 4, 1884 |